(12) United States Patent
Leinonen

(10) Patent No.: US 10,074,290 B2
(45) Date of Patent: Sep. 11, 2018

(54) LANGUAGE TRAINING APPARATUS, METHOD AND COMPUTER PROGRAM

(75) Inventor: Timo-Pekka Leinonen, Tampere (FI)

(73) Assignee: WordDive Ltd., Tampere (FI)

( * ) Notice: Subject to any disclaimer, the term of this patent is extended or adjusted under 35 U.S.C. 154(b) by 0 days.

(21) Appl. No.: 13/505,453

(22) PCT Filed: Oct. 20, 2009

(86) PCT No.: PCT/FI2009/050842
§ 371 (c)(1),
(2), (4) Date: May 1, 2012

(87) PCT Pub. No.: WO2011/048254
PCT Pub. Date: Apr. 28, 2011

(65) Prior Publication Data
US 2012/0308968 A1 Dec. 6, 2012

(51) Int. Cl.
*G09B 19/06* (2006.01)

(52) U.S. Cl.
CPC .................. *G09B 19/06* (2013.01)

(58) Field of Classification Search
CPC .................. G09B 7/00; G09B 7/02
USPC ................ 434/156, 322, 352, 362
See application file for complete search history.

(56) References Cited

U.S. PATENT DOCUMENTS

| | | | |
|---|---|---|---|
| 3,369,308 A | 2/1968 | Curran | |
| 5,657,256 A * | 8/1997 | Swanson | G09B 7/04 702/119 |
| 5,827,070 A * | 10/1998 | Kershaw | G09B 7/02 434/322 |
| 6,022,221 A * | 2/2000 | Boon | G09B 5/065 434/118 |
| 6,118,973 A * | 9/2000 | Ho et al. | 434/362 |
| 6,652,283 B1 * | 11/2003 | Van Schaack | G09B 5/00 434/236 |
| 6,743,024 B1 * | 6/2004 | Ivler | G09B 5/00 434/118 |
| 7,286,793 B1 * | 10/2007 | Miele | G09B 7/00 434/323 |
| 2002/0055089 A1 | 5/2002 | Scheirer | |

(Continued)

FOREIGN PATENT DOCUMENTS

| | | |
|---|---|---|
| EP | 2019383 A1 | 1/2009 |
| GB | 2229030 A | 9/1990 |

(Continued)

*Primary Examiner* — Xuan Thai
*Assistant Examiner* — Sadaruz Zaman
(74) *Attorney, Agent, or Firm* — Ziegler IP Law Group, LLC

(57) ABSTRACT

An apparatus with a memory that has a learning database and a user database. The learning database has a set of details to be learned and the user database has a user profile. The user profile has a weighing vector of weighing parameters corresponding to the set of details. The apparatus further has a processor configured to test a user for particular details in an order that is at least partly based on the weighing parameters. The processor is further configured to adjust the weighing parameter corresponding to a given detail depending on whether the user has passed the test. Also corresponding methods and computer programs are disclosed.

19 Claims, 4 Drawing Sheets

(56) References Cited

U.S. PATENT DOCUMENTS

| | | | |
|---|---|---|---|
| 2003/0077559 A1* | 4/2003 | Braunberger | G09B 7/00 434/322 |
| 2005/0266387 A1* | 12/2005 | Rossides | G09B 7/00 434/323 |
| 2006/0035207 A1* | 2/2006 | Henson | G09B 7/00 434/350 |
| 2007/0031801 A1* | 2/2007 | Tidwell-Scheuring | G09B 7/00 434/322 |
| 2007/0208536 A1* | 9/2007 | Spector | G09B 7/00 702/182 |
| 2008/0145832 A1* | 6/2008 | Lee | G09B 7/00 434/362 |
| 2008/0187898 A1* | 8/2008 | Hattie | G09B 7/00 434/350 |
| 2010/0273138 A1* | 10/2010 | Edmonds | G09B 3/00 434/322 |
| 2011/0039244 A1* | 2/2011 | Packard | G09B 5/00 434/350 |
| 2011/0065069 A1* | 3/2011 | Duffy | G09B 19/00 434/156 |

FOREIGN PATENT DOCUMENTS

| | | | |
|---|---|---|---|
| GB | 2360389 A | 9/2001 | |
| WO | 0182264 A1 | 11/2001 | |

* cited by examiner

| | 520 | |
|---|---|---|
| 510 → $Q_1$ | $Qt_1$ | $A_1$ ← 530 |
| 510 → $Q_2$ | $Qt_2$ | $A_2$ ← 530 |
| 510 → $Q_3$ | $Qt_3$ | $A_3$ ← 530 |
| 510 → $Q_4$ | $Qt_4$ | $A_4$ ← 530 |
| ... | ... | ... |
| 510 → $Q_N$ | $Qt_N$ | $A_N$ ← 530 |

- Login ID — 610
- Passwd — 620
- Name — 630
- Subject — 640
- history — 650
- objectives — 660

| 670 → $V_1$ | $t_1$ ← 680 |
|---|---|
| 670 → $V_2$ | $t_2$ ← 680 |
| 670 → $V_3$ | $t_3$ ← 680 |
| 670 → $V_4$ | $t_4$ ← 680 |
| ... | ... |
| 670 → $V_N$ | $t_N$ ← 680 |

US 10,074,290 B2

LANGUAGE TRAINING APPARATUS, METHOD AND COMPUTER PROGRAM

TECHNICAL FIELD

The aspects of the disclosed embodiments generally relate to a language training apparatus, method and computer program, and particularly, though not exclusively, to a network based language training.

BRIEF DESCRIPTION OF RELATED DEVELOPMENTS

Various computer programs and dedicated devices have been designed to help people in using and learning of foreign languages. The building of vocabulary is often perceived as laborious and even unattractive a task that requires plenty of repetition in order to memorize new words and maintain earlier learned words in the memory of a learner. There are numerous publications which deal with such self-learning with help of a computer. For instance, EP2019383 discloses a method for the computer-assisted learning of orthography, the method comprising executing the following steps by a data processing system:—retrieving a main set of words from a data storage;—retrieving an error data set associated with said main set of words from the data storage;—repeatedly executing the following steps:—selecting a word to prompt the user with, by computing, for each word from the error data set, a statistic measure related to the probability of an error occurring in said word, and selecting the word which has the maximum value of said statistic measure;—prompting (14) the user with said word;—accepting a user input specifying a sequence of symbols;—comparing the user input with said word;—updating and storing the error data set.

GB2360389 discloses another teaching program in which structured query language is used to operate with databases. A customized user database is built with information that enables focusing future questions in a meaningful way. The user database comprises various tables such as a customized diagnostic profile (CDP) that contains information about errors made by the user, question type for asked questions, user time for answering each question, number of times the question has been used, number correct for correct answers for each question type and so on. A content information database is used to track user performance relating to each content record. A content ID refers to a specific content record in the content database. According to this publication, a complex data structure is built for tracking the progress and controlling further training of a given user.

U.S. Pat. No. 6,022,221 discloses a teaching machine that presents questions to the user who responds with answers. Graded interval recall is accomplished by storing the exact time and date when the user learns a correct answer. The machine determines the presentation mode and review schedule for each unit according to the length of real time that has elapsed since the user learns the material. Precise timing is designed to bridge the threshold between short-term and long-term memory by interrupting default sequencing of material to review items at an exact preset interval from the time the user learned the material.

GB2229030 discloses an electronic educational device that maintains a base lexicon and a current lexicon and shifts words from current lexicon to base lexicon when they are learned and back to current lexicon, if errors are made with the words. The training can be carried out with the current lexicon so that one by one, words are shifted from one tier to another on each correct answer and finally transferred to the base lexicon. In this publication, the words are thus arranged in different ordered lists.

WO0182264 discloses an interactive and computer-aided speech education method to improve efficiency of learning by monitoring the student's progress and pacing the course material to the student's ability to comprehend and learn. In case of errors, material is replayed relating to those questions which were missed. Recorded history of correcting mistakes is used in determining to use audible emphasis for incorrectly pronounced phonemes in this type of remedial reinforcement.

Moreover, U.S. Pat. No. 3,369,308 discloses using of a particular tape player system to help learning. This publication discloses helping a learner to memorize or otherwise focus on objects to be learned using a variety of experiences that are (a) tactile, (b) visual, (c) cortical and (d) aural. Lamps of different colors are selectively actuable by the student in recognition by the student of a particular grammatical usage involved in the information presented. This publication also discloses allowing the learner to control the number of repetitions and the speed of the visual tape that is used for the teaching.

Overall, there are numerous different publications which disclose a host of different methods for aiding learning of languages. However, in terms of learning efficiency, there is a constant need for even better systems. Moreover, it is desired to enhance deployment of learning systems and to reduce hardware requirements.

SUMMARY

According to one embodiment, there is provided an apparatus comprising:
a memory comprising a learning database and a user database; the learning database comprising a set of details to be learned;
the user database comprising a user profile, the user profile comprising a weighing vector of weighing parameters corresponding to the set of details; and
a processor configured to test a user for particular details in an order that is at least partly based on the weighing parameters;
wherein the processor is further configured to adjust the weighing parameter corresponding to a given detail depending on whether the user has passed the test.

The apparatus is preferably a network server. Alternatively, the apparatus is a user device.

Advantageously, small computational cost and memory requirement is imposed by maintaining weighing vectors of weighing parameters for different users so that the weighing vectors correspond to details in the learning database.

The processor may be configured to select the particular detail by choosing details in defined sets which consist of details of predetermined range of weighing parameters.

The predetermined range may comprise any one or more of the following four subsets:
a first subset of details the testing of which the user has passed;
a second subset of details that the user has passed on the latest test but not on the immediately preceding test;
a third subset of details the testing of which the user has not passed on the latest test and the user has attempted that test at least once before;
a fourth subset of details the testing of which the user has not attempted.

The predetermined range may be balanced such that if there are sufficiently many details in the respective subsets, the predetermined range contains a first proportion details of the first subset, a second proportion of details of the second subset, a third proportion of details of the third subset and a fourth proportion of details of the fourth subset.

Advantageously, when learning of the user progresses, the details may be shifted by the processor from the one subset to a preceding subset (e.g. from the second subset to the first subset). Advantageously the shifting may enhance learning efficiency by attempting to maintain a predetermined mix of details being tested.

The processor may be configured to initially set the weighing parameters to an initial value. Each time the user passes the test of the detail, the processor may increase the weighing parameter towards a predetermined maximum. Each time the user fails in the test of the detail, the processor may decrease the weighing parameter towards a predetermined minimum. The predetermined minimum may be larger than the initial value. Alternatively, the predetermined minimum may be smaller than or equal to the initial value.

The user profile may also comprise time vector comprising for each detail a time stamp indicative of the latest time the detail has been tested.

The details may be stored in the learning database in an order corresponding to relative priority of the details for learning. The order may be ascending or descending. Alternatively, the learning database may further comprise priority factors associated with some or all of the details for selecting subsets of the details making use of the priority factors.

The processor may be further configured to account for the time stamps so as to maintain a minimum interval between two tests concerning a common detail. The timestamps may increase the likelihood that the details are recalled from a long term memory of the user so as to enhance permanent learning. Moreover, this may increase the number of different details the testing of which is repeated during a learning day increasing the variance of the learning and making the learning thus more motivating.

The details may comprise details of a human language. The details may comprise any of the following: words of vocabulary of the language; grammar rules and exceptions of grammar rules including any classification; expressions; typical sentences; idiomatic expressions; abbreviations; conjugations of aforementioned details; proper context to use for any of the aforementioned details.

The apparatus may further comprise a speech synthesizer. Alternatively, or additionally, the details may be stored in spoken form.

The apparatus may be configured to present details in a tone indicative of the type of the details. The type may be the article of nouns.

According to a second embodiment, there is provided a method comprising:
accessing a learning database comprising a set of details to be learned;
accessing a user database comprising a user profile, the user profile comprising a weighing vector of weighing parameters corresponding to the set of details;
testing a user for particular details in an order that is at least partly based on the weighing parameters; and
adjusting the weighing parameter corresponding to a given detail depending on whether the user has passed the test.

According to a third embodiment there is provided a computer program comprising:
computer executable program code configured to enable a computer to access a learning database comprising a set of details to be learned;
computer executable program code configured to enable a computer to access a user database comprising a user profile, the user profile comprising a weighing vector of weighing parameters corresponding to the set of details;
computer executable program code configured to enable a computer to test a user for particular details in an order that is at least partly based on the weighing parameters; and
computer executable program code configured to enable a computer to adjust the weighing parameter corresponding to a given detail depending on whether the user has passed the test.

Any foregoing memory medium may comprise a digital data storage such as a data disc or diskette, optical storage, magnetic storage, or opto-magnetic storage. The memory medium may be formed into a device without other substantial functions than storing memory or it may be formed as part of a device with other functions, including but not limited to a memory of a computer, a chip set, and a sub-assembly of an electronic device.

Some embodiments may be presented only with reference to certain aspects of the disclosure. It should be appreciated that corresponding embodiments may apply to other aspects as well.

BRIEF DESCRIPTION OF THE DRAWINGS

The aspects of the disclosed embodiments will be described, by way of example only, with reference to the accompanying drawings, in which:

FIG. 5 illustrates a learning database suited for use in the system of FIG. 1; and FIG. 6 illustrates a user database suited for use in the system of FIG. 1.

DETAILED DESCRIPTION

In the following description, like numbers denote like elements.

Learning of details of a foreign language may be significantly accelerated if the learning process i.e. repetition of the details is optimized according to the individual learner's detail specific learning history. There is a need for a simple, lightweight process to teach these details in the optimal order and repetition frequency in order to arrange the learning using a network server that is easily accessible with common web browsers.

Figure 1:
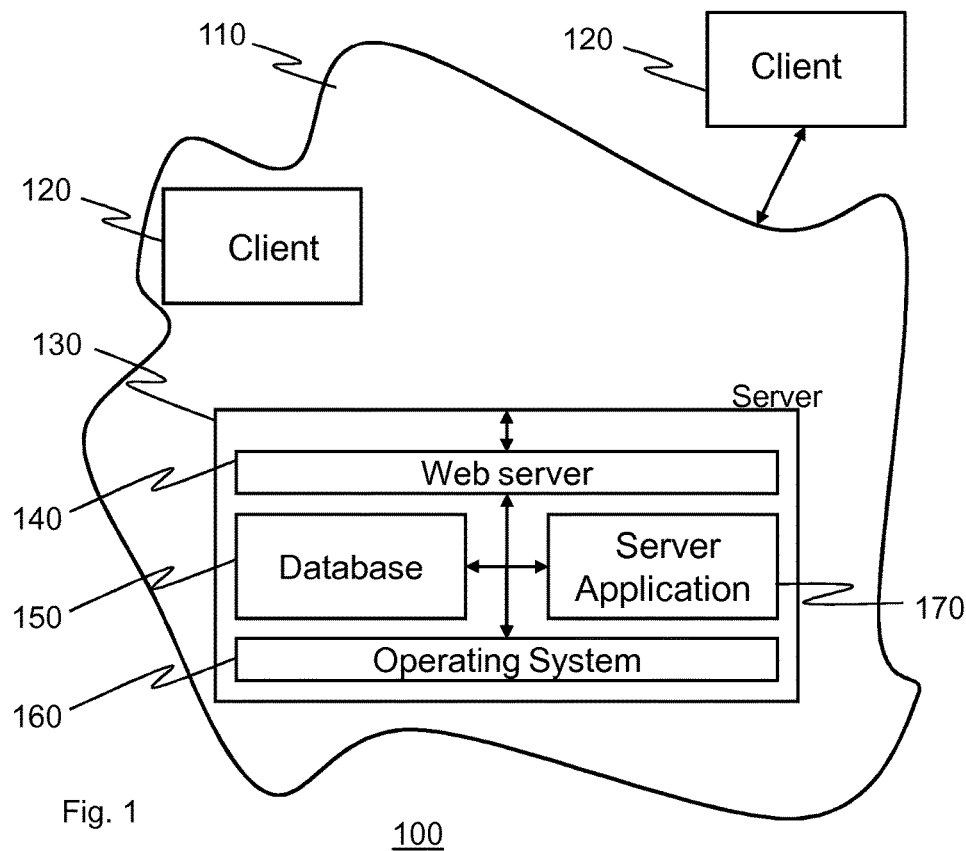
FIG. 1 shows a schematic picture of a system according to one embodiment.

FIG. 1 shows a schematic picture of a system 100 according to one embodiment. The system 100 comprises a data network 110 such as the Internet that provides access for a plurality of clients 120 to a server 130. The server 130 comprises a web server 140 that provides Internet browser based access to the server 130, a database 150, operating system 160 and server application 170 that controls the operation of the server e.g. according to the process illustrated by FIG. 3. The server 130 is provided for functional description of an example network entity for using certain embodiments of the disclosure. It is appreciated that the implementation of the server 130 may be widely varied, e.g. the database 150 may be distributed to a discreet database server. Moreover, the server 130 may be implemented using cluster technology so that a common server computer may implement the server 130 among other functions.

Figure 2:
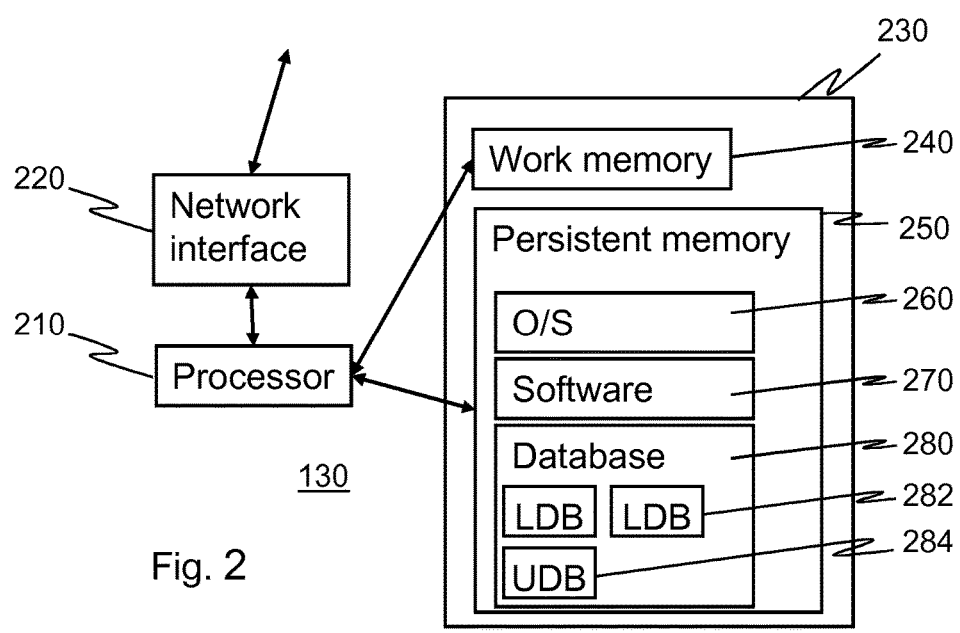
FIG. 2 shows a block diagram of a server according to one embodiment.

FIG. 2 shows a block diagram of the server 130 according to an embodiment of the disclosure. The server comprises a processor 210 for controlling various parts of the server, a network interface 220 for data exchange with other network entities (with clients and optionally with other servers) and a memory 230. The memory 230 comprises a work memory 240 such as a random access memory in which the processor may execute different programs or computer executable program code that controls with the processor the operation of the server 130. The memory 230 further comprises a persistent memory 250 that comprises an operating system 260 for controlling the use of resources of the server 130, software 270 such as the computer program code defining the web server 140 and server application 170, and a database 280. The database 280 practically involves two or more different databases, i.e. there are one or more different learning database (LDB) 282 containing e.g. questions and answers related to grammar and/or vocabulary of a foreign language. The questions may be formed, for instance, so that they comprise three parts: a question text ($Q_1$ to $Q_N$ in FIG. 4), answer type indicator (e.g. number, selection indication such as "a, b, c or d", free text, $Qt_1$ to $Qt_N$ in FIG. 4), and criteria for correct answer (e.g. correct selection indication or alternative answer texts with optional tolerance coefficient, $A_1$ to $A_N$ 420 in FIG. 4). For instance, one question may be vocabulary-related "Cat in German? (text)" to which the user should write as an answer "die Katze". Some tolerance may be provided so that e.g. one letter error is accepted as a passed test, while then the deviation is e.g. automatically corrected so that the user would learn also the correct form. The correct answer may comprise one or more data fields. For instance, German nouns have three articles which may be defined simply with two bits (one of the four combinations indicative of that the word is not a noun and other three for the corresponding options, "der", "die", or "das"). The databases 280 also involve a user database 284, which typically comprises user's login details such as Login ID 610 and password 620 (FIG. 6), name 630 (FIG. 6), subject or topic for exercise 640 (FIG. 6), use history 650 (FIG. 6), learning objectives 660 (FIG. 6) and also one or more vectors of parameters (e.g. weighing parameters 670 and time stamps 680) as will be explained with further detail.

It is seen as a pre-requisite for the process described with reference to FIG. 3 that the details (e.g. questions and answers in FIG. 5) are organized into descending priority order according to the importance of learning those details in general, for a specific user group e.g. restaurant workers or business travellers, or for an individual user based on his specific learning targets. Alternatively, the details are organized in another order (e.g. alphabetically) and the details are associated with relative priority factors for selecting details in a meaningful order. In the following, it is assumed that the learning database is in the descending priority order.

The learning database may be common to a group of learners (e.g. based on a given level in the language being studied) or the learning database may be tailored to a specific learner and her targeted usage of the language to be learned. In any case, the starting point is that there is a learning database LDB 282 that remains unchanged through the exercise session. Only weighing parameters and optionally time stamps are being updated in the user's profile in course of an exercise and through a training program as a whole. There should be no need to rearrange an entire user dictionary and also typically users may share a common dictionary so that the user profiles can be kept very compact and thus computationally light.

The weighing parameters 670 can be seen as a representation of the user's learning history of a detail. The process of FIG. 3 can indeed express not only the latest test result or trial result but also the result of earlier tests so that the process can be seen as a particularly powerful one and even more so for the use in network servers where a single server may be needed for a vast number of clients.

Figure 3:
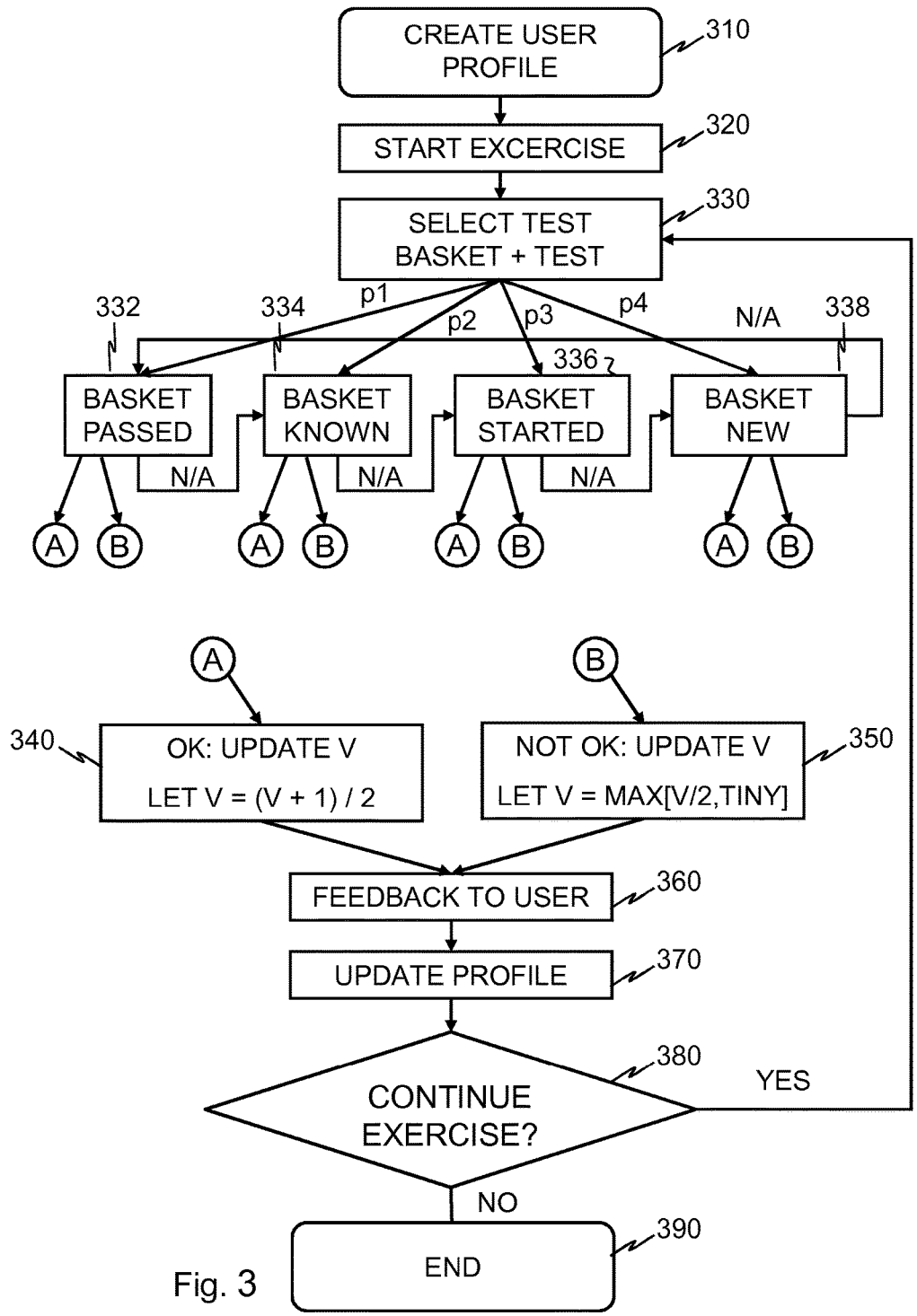
FIG. 3 shows a flow chart of a process according to one embodiment.

FIG. 3 shows a flow chart of a process according to an embodiment of the disclosure. The process starts from step 310, in which the server 130 is up and running and the server creates a new user profile. Typically, this step involves assigning a new user with login credentials and initializing parameters stored for the user. Advantageously, each user has a vector of weighing parameters (i.e. a weighing vector formed of the weighing parameters 670) and optionally another vector of time stamps 680. The weighing parameters 670 correspond to details or to questions and answers 510,520,530 of the learning database 282. In the particularly described method, the weighing parameters 670 are first initialized to zero value. This method is next described assuming that the weighing parameters are floating point numbers. However, in practical implementation, the weighing parameter can be represented e.g. as a five or seven bit number ranging between 0 and 1 so as to reduce memory requirements, while the weighing parameter is translated in use to a number in this range. Moreover, it is appreciated that the described embodiment is but one example on how a network based server can computationally efficiently serve numerous clients (e.g. thousands of simultaneous sessions) with economically reasonable computational resources.

Once the user desires to start practising with the learning system, a learning session is started 320. In a single learning session, details (or questions) are presented to the learner in relatively small sets (e.g. N=5, N=10 or N=20). Testing if the learner knows a given detail is called a try, and going through one set of details (a set of tries) is called an exercise.

After the user starts an exercise, a test basket is selected 330 for selecting a test of a particular type. At this step, the user is provided with varying of the types of the questions so that:

desired first proportion p1 of the questions relates to details that has been correctly answered by the user for several consecutive tries in a row (basket passed, 332),
desired second proportion p2 of the questions relates to details that were known last time, but not in the try before that (basket known, 334),
desired third proportion p3 of the questions relates to details that were answered wrong on latest try (basket started, 336),
desired fourth proportion p4 of the questions relates to details that have not yet been tested (basket new, 338), The baskets known, started and new collectively form an exercise basket of details or tests to be exercised. Furthermore, the passed details are also being exercised to an extent that is useful for maintenance of the learning of those details.

The test basket selection may be based, for instance, by randomly selecting a number from a range that is split into sub-ranges in proportion to the previously described proportions (first to fourth proportion). If there are no details in the selected basket, the selection should advance to following basket in the order these baskets were described in the foregoing and as illustrated by FIG. 3.

When the basket "new" becomes empty i.e. the learning of all the details has started, the selection should advance to any details based to the ascending order of the value v. In practice, this means selecting any details starting with those with the lowest level of knowledge. This, with the above described advance of the selection to the following basket, leads to a situation where in the end all the details are in the passed basket i.e. permanently learned. However, the training may still continue, and the training may further automatically shift to maintaining the achieved level of knowledge focusing on those details with the lowest level of knowledge including the passed details.

Let us next describe how the details are categorized into the different test baskets. First, let still stress that the innovation can be modified to work using integers, fraction numbers, floating point numbers, or any other numeric type or range, but is presented here using floating point numbers having range from 0.0 to 1.0.

First Exercise

1. Before starting, the weighing parameter v of each floating point number is initialized to zero (0.0).
2. Details are selected to an exercise in priority order. As there is no learning history at the beginning, the first exercise will consist of the N first details that also correspond to N highest priority details (as the details are listed in descending order of priority).

Details are presented to the user e.g. one by one using appropriate hints such as picture, video, sound, scent, description, definition, synonyms, antonyms, other hints. The weighing parameter representing the learning history of this detail is updated based on the result of the try as follows:

If the result is positive i.e. the detail was known, the process advances to branch (A) in step 340 and the weighing parameter is updated according to equation (1):

$$\text{Let } v=(v+1.0)/2.0 \tag{1}$$

If the result is negative i.e. the detail was not known, the process advances to branch (B) in step 350 and the weighing parameter is updated according to equation (2):

$$\text{Let } v=\text{MAX}(v/2.0,\text{TINY}) \tag{2}$$

In equations (1) and (2), v is given a new value based on its previous value. TINY is a predefined constant that represents a small numeric value e.g. 0.0001.

Advantageously, by setting v to TINY in situations where v would otherwise get value zero, the tested detail is distinguishable from other details that have never been tried.

The classification of a detail in the various baskets follows the following rules:

PASSED i.e. known several consecutive tries in row and therefore considered as permanently learned. This is done by searching vector for values where v≥0.75 known last 2 times
v≥0.875 known last 3 times
v≥0.9375 known last 4 times
etc.

The threshold value for v in the foregoing (0.75, 0.875, 0.9375, . . . ) is also referred to as passed threshold that may be generally be defined, based on a number M of required consecutive positive tries: Passed threshold=$1-(\frac{1}{2})^M$ KNOWN i.e. known last time, but not in the try before that 0.5≤v<passed threshold (e.g. 0.75)

STARTED i.e. tried but answered wrong during the last try 0.0<v<0.5

NEW i.e. never tried v=0.0

It is apparent from the classification example that the single weighing parameter is capable of maintaining the state of corresponding detail's learning and of ordering the details in a feasible manner so as to enhance learning by focusing attention on where it helps the learner the most.

The user is provided with feedback in step 360 to provide the user with appropriate positive or negative feedback depending on the answer to the latest test.

The user's profile is updated 370 according to the outcome of the test. The updating may alternatively be arranged before providing the feedback to the user; that order may be particularly useful e.g. to avoid changing the outcome by simply closing the session.

It is next checked 380 whether the exercise is continued. This checking may involve whether there are remaining details in the exercise basket. Moreover, if the exercise basket has exhausted, the user may be prompted for a new exercise. If the exercise is to be continued, the process resumes to step 330. If a new exercise is to be started, the process resumes to step 320. If the exercising is to end, the process terminates at step 390.

Time

The algorithm described in the foregoing is further enhanced in one embodiment by saving for each detail in addition to the weighing parameter v a learner specific time stamp in the time vector to indicate the time of the last try of that detail. Using this time stamp the processor may maintain a minimum interval (e.g. 24 hours, one night or one hour) between the repetitions of a given detail. This increases the number of different details repeated during a learning day, and ensures that especially the known and passed details have been memorized deeply and not only on surface level.

Test Results

In the test made using English, French, German, Japanese, Russian, Spanish and Swedish as foreign languages this algorithm proven to significantly increase the learning speed of a foreign language regardless of the language in questions is probably applicable to all languages, including mother tongue for students with learning difficulties.

Figure 4:
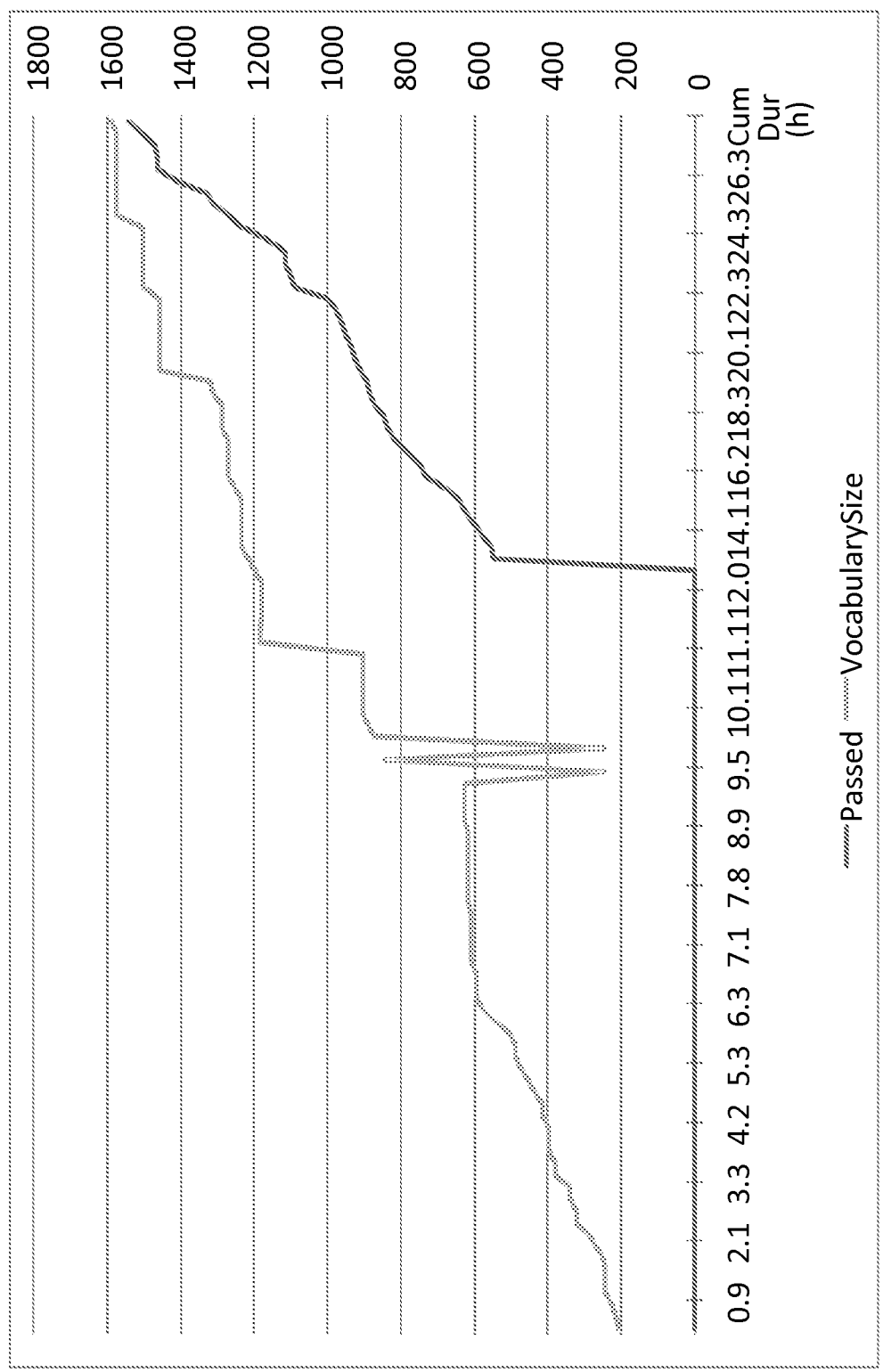
FIG. 4 illustrates test results achieved by using the process described with reference to FIG. 3 where a native Finnish speaker started studying Spanish.

FIG. 4 illustrates test results achieved by using the process described with reference to FIG. 3 where a native Finnish speaker started studying Spanish. FIG. 4 charts the amount of different details (vocabulary size in the chart) and the number of passed details as a function of cumulative exercise time. The vocabulary size describes the starting of new details. That is, initially there are about 200 details in the started and known baskets together, and as the training proceeds, details are shifted based on the result of the test from new basket to the started basket (negative results) and known basket (positive result). Details in these two baskets are then tested frequently based on the aforementioned process until the detail specific value v reaches the passed threshold and the detail moves to the passed basked (passed in the chart).

Around 9.5 hours of cumulative exercising, considerable decrease of the size of the started and known baskets was tested without significant noticed impact to the learning speed.

Details have been shifted to the passed basket since the beginning of the trial based on the passed threshold. Unfortunately, collecting of statistical information about this shifting rate was started only after 12 cumulative exercise hours. However, based on the described algorithm, the shifting rate of details to the passed basked can be safely assumed to have started relatively slowly due to the required number of detail specific consecutive positive tests, accelerating then towards 12 hours and after that milestone. This, however, does not impact an important finding that resulted from the trial: out of 1588 new details, 1541 (97%) were permanently learned in 27.1 hours. This knowledge was proven through several consecutive positive tests with at least 24 h interval. Moreover, the test was conducted with strict spelling criteria, that is, without any tolerance for any wrong capitalization, extra blanks or corresponding deviations. Anything else but exact string match was considered as a negative test result. Only character by character complete match qualified as a positive test result. Therefore, at least a considerable part of the remaining 3% of the details below the passed threshold are considered to be so classified rather due to erroneous typing and other simple mistakes rather than errors in learning. On average, outcome translates into learning of 56.8 details per hour.

For this student, who normally needs several hundred hours of effort in order to learn 1500 details of a new language using traditional methods, the learning efficiency improvement was significant. In addition, the learning was experienced more motivating due to optimized and variable repetition order of the details.

Assuming this kind of learning speed, and e.g. that the learned details of a language are the most important words of its vocabulary, a vocabulary of 2 000 words can be assumed to be learned during less than 40 hours of effort (2 000 details/40 h=50 details/h). Especially as the learning typically accelerates as function of time due to the learner becoming more familiar with the spelling, forming of associations with other languages and other typical characteristics of the language being learned.

Depending on the language and reference, 2 000 most frequent words typically cover 95% of the normally used language. This in turn means that with cumulative effort corresponding to the hours of a working week, it is possible to learn vocabulary that enables fluent usage of a language including reading, writing, speaking and listening. This, in addition to being a valuable achievement itself and a typical target of year long language courses, enables further learning of a language on natural basis. If there is a concept or word that the learner is not familiar with, he is able to ask about it, and able to understand the received explanation. He is also able to understand meaning of written or heard words based on their context and surrounding words, and able to use monolingual dictionaries.

Details of a foreign language include but are not limited to
1. words of its vocabulary
2. grammar rules and exceptions including any classification
3. expressions and typical sentences
4. abbreviations
5. conjugation of those details
6. proper context to use those details Another example embodiment provides help with learning the articles of nouns by means of technical facilities. Namely, it is known that one particularly difficult area in the learning of a foreign language is to learn the articles of nouns e.g. der-die-das of German, el-la of Spanish, le-la of French, en-ett of Swedish etc. It is realised that this problem can be eased making use of neurologically different cognition of different tones or voices so as to direct stimulus to different parts of human brain and help to establish an association between nouns and their articles. This mechanism is one likely possibility and explains the measured effect of this method. In this example, the processor is configured to audibly express different nouns using voices of different persons in order to facilitate the learning of the genders of the nouns. For example, a man's voice is used to pronounce all Swedish "en" nouns, a female voice for all Swedish "ett" nouns. This method may also be referred to as acoustic distinguishing of articles or other grammatical features. Thanks to the method, it has been noticed that the learning becomes faster and easier for either consciously or unconsciously to separate and know the articles of the nouns of the studied language.

The foregoing description has provided by way of non-limiting examples of particular implementations and embodiments a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments may be used to advantage without the corresponding use of other features. As such, the foregoing description shall be considered as merely illustrative of the principles of the present invention, and not in limitation thereof. Hence, the scope of the invention is only restricted by the appended patent claims.

What is claimed is:

1. An apparatus comprising:
a memory comprising a learning database and a user database;
the learning database comprising a set of details to be learned; and
the user database comprising a user profile, wherein:
the user profile comprises a weighing vector of weighing parameters, each weighing parameter from the weighing vector corresponding to a detail in the set of details; and
the apparatus further comprises a processor configured to test a user during a testing process on a given detail from the set of details, wherein one or more details are tested in an order that is at least partly based on the weighing parameters;
wherein the processor is further configured:
to adjust, after each test on a given detail, a weighing parameter corresponding to the given detail depending on whether the user has passed the test of the given detail;
to select the given detail from one or more defined subsets of the set of details based on the weighing parameter, wherein each defined subset corresponds to a different predetermined range of weighing parameters; and
to shift, when learning of the user progresses, the given detail from one defined subset to another defined subset based on the adjustment of the weighing parameter; and
wherein the selecting of the given detail and the shifting of the given detail from one defined subset to another defined subset are performed by processing the user profile without changing the learning database.

2. The apparatus according to claim 1, wherein the apparatus is a network server.

3. The apparatus according to claim 1, wherein the processor is further configured to simultaneously test a plurality of users using the learning database.

4. The apparatus according to claim 1, wherein the one or more defined subsets of the set of details comprises any one or more of the following four subsets:
- a first subset of details the testing of which the user has passed;
- a second subset of details that the user has passed on a latest test but not on an immediately preceding test;
- a third subset of details the testing of which the user has not passed despite of having attempted;
- a fourth subset of details the testing of which the user has not attempted.

5. The apparatus according to claim 1, wherein the processor is further configured to initially set the weighing parameters to an initial value.

6. The apparatus according to claim 5, wherein the processor is further configured to increase, each time the user passes the test of the given detail, the weighing parameter towards a predetermined maximum.

7. The apparatus according to claim 5, wherein the processor is further configured to decrease, each time the user fails in the test of the given detail, the weighing parameter towards a predetermined minimum.

8. The apparatus according to claim 7, wherein the predetermined minimum is larger than the initial value.

9. The apparatus according to claim 1, wherein that the user profile further comprises a time vector comprising for each detail of the set a time stamp indicative of the latest time the detail has been tested.

10. The apparatus according to claim 1, wherein the details are stored in the learning database in an order corresponding to a relative priority of the details for learning.

11. The apparatus according to claim 1, wherein the processor is further configured to account for the time stamps so as to maintain a minimum interval between two tests concerning a common detail.

12. The apparatus according to claim 1, wherein the details comprise details of a human language.

13. The apparatus according to claim 1, wherein the details comprise any of the following: words of vocabulary of the language; grammar rules and exceptions of grammar rules including any classification; expressions; typical sentences; idiomatic expressions; abbreviations; conjugations of aforementioned details; proper context to use for any of the aforementioned details.

14. The apparatus according to claim 1, wherein the apparatus further comprises a speech synthesizer configured to reproduce the details by synthesized speech.

15. The apparatus according to claim 1, wherein the details are stored in spoken form.

16. The apparatus according to claim 1, wherein the processor is further configured to present details in a tone indicative of the type of the details.

17. The apparatus according to claim 16, wherein the type is the article of nouns.

18. A method comprising:
- accessing a learning database comprising a set of details to be learned;
- accessing a user database comprising a user profile, wherein:
- the user profile comprises a weighing vector of weighing parameters, each weighing parameter from the weighing vector corresponding to a detail in the set of details; and the method further comprises:
- testing a user during a testing process on a given detail from the set of details, wherein one or more details are tested in an order that is at least partly based on the weighing parameters;
- adjusting the weighing parameter corresponding to the given detail after each test on the given detail depending on whether the user has passed the test of the given detail;
- selecting the given detail from one or more defined subsets of the set of details based on the weighing parameter, wherein each defined subset corresponds to a different predetermined range of weighing parameters; and
- shifting, when learning of the user progresses, the given detail from one defined subset to another defined subset based on the adjustment of the weighing parameter; and
- wherein the selecting of the given detail and the shifting of the given detail from one defined subset to another defined subset are performed by processing the user profile without changing the learning database.

19. A computer program comprising:
computer executable program code, which, when run on a computer is configured to:
enable a computer to access a learning database comprising a set of details to be learned;
enable the computer to access a user database comprising a user profile, wherein:
the user profile comprises a weighing vector of weighing parameters, each weighing parameter from the weighing vector corresponding to a detail in the set of details; and the computer executable program code, when run on the computer is further configured to:
- enable the computer to test a user during a testing process on a given detail from the set of details, wherein one or more details are tested in an order that is at least partly based on the weighing parameters;
- enable the computer to adjust, after each test on a given detail, a weighing parameter corresponding to the given detail depending on whether the user has passed the test of the given detail;
- select the given detail from one or more defined subsets of the set of details, wherein each defined subset corresponds to a different predetermined range of weighing parameters; and
- shift, when learning of the user progresses, the given detail from one defined subset to another defined subset based on the adjustment of the weighing parameter;
wherein the selecting of the given detail and the shifting of the given detail from one defined subset to another defined subset are performed by processing the user profile without changing the learning database.

* * * * *